Jan. 9, 1940.  T. H. SLOAN  2,186,179
TUMBLER PRESS
Filed June 19, 1936  5 Sheets-Sheet 1

INVENTOR
Theodore H. Sloan
BY William B. Jaspert
ATTORNEY

Jan. 9, 1940.   T. H. SLOAN   2,186,179
TUMBLER PRESS
Filed June 19, 1936    5 Sheets-Sheet 4

INVENTOR
Theodore H. Sloan
BY William B. Jaspert
ATTORNEY

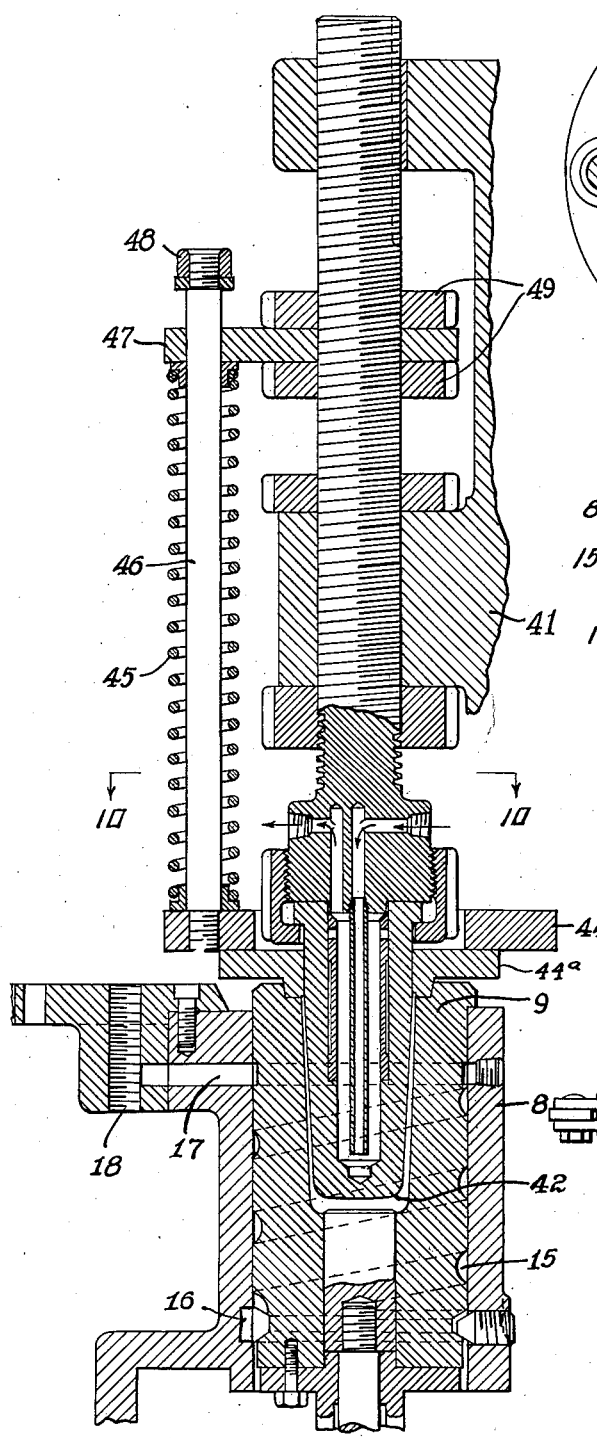
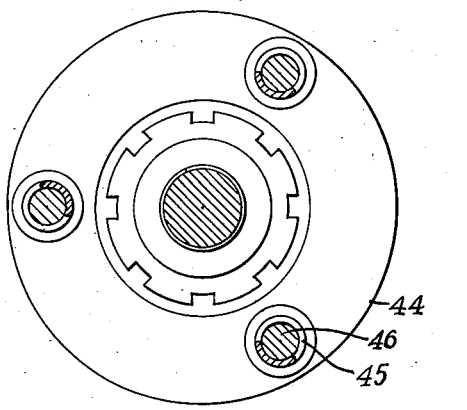
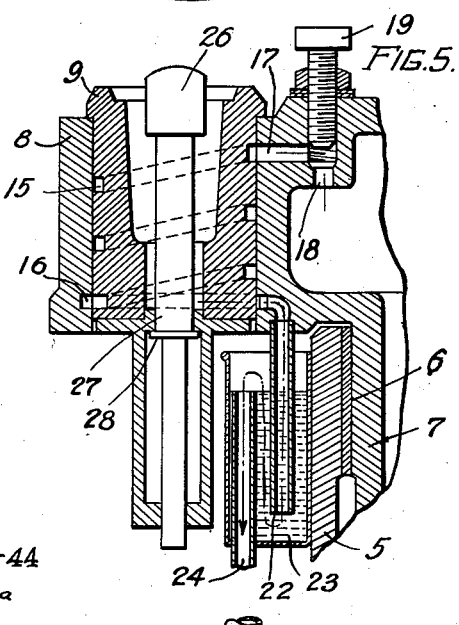

Patented Jan. 9, 1940

2,186,179

UNITED STATES PATENT OFFICE 2,186,179

TUMBLER PRESS

Theodore H. Sloan, Charleroi, Pa., assignor to G. M. S. Corporation, Pittsburgh, Pa., a corporation of Pennsylvania Application June 19, 1936, Serial No. 86,144

12 Claims. (Cl. 49—37)

This invention relates to new and useful improvements in glassware-forming machines, more particularly to tumbler presses for forming thin-walled glassware and thin glass tumblers by pressing a small mass of molten glass in a suitable mold very rapidly.

The making of glass tumblers in tumbler presses has been unsuccessful because of numerous difficulties inherent in the design and operation of tumbler presses, among which the major difficulties are the irregularity of stroke or travel of the forming plunger; misalignment of the molds and plunger caused by irregular and excessive thermal expansion of the molds and mold tables; and rapid solidification of the glass in the mold due to the insufficient speed of the mold operation.

In accordance with the present invention, these and other difficulties are overcome by providing for a steady and controlled movement of the forming plunger at relatively high speed and by designing the molds and mold table of minimum mass with controlled cooling to minimize thermal expansion of the molds and mold table, to eliminate misalignment of the molds and plunger and minimize the thermal differential, if any, between the metal of the mold and plunger, resulting in the formation of tumblers of uniform and concentric wall section.

Further objects of the invention are to provide a multiple mold tumbler press embodying a novel construction of molds and table in which the molds are mounted for ready removal, and which is designed to effect a substantial reduction in the size and mass of the molds and table whereby error due to thermal expansion is reduced and because of its reduced mass the machine may be indexed at high speed thereby increasing production.

Another object of the invention is the provision of a relatively small mold table designed to receive a large number of molds, and because of the reduction in mass of the metal employed, permit the use of better quality materials, thereby obtaining greater accuracy and consequent increased production of ware having uniform walls.

Still a further object of the invention is the adaptation of the mold and mold supports to the use of a cooling medium which is less expensive and more effective than air.

It is a further and primary object of the invention to provide a method of operating the plunger to eliminate uncontrolled travel of the plunger movements into the molds, while positively controlling the rate of travel of the plunger independently of the pneumatic actuating medium by which the plunger is moved and to provide for the positive retraction of the plunger to prevent sticking thereof in the molds.

The type of glassware forming apparatus to which this invention appertains, consists of a plurality of molds mounted on a rotatable support or table, the molds being adapted to receive a mass of molten glass during a dwell period of the table, after which and in the same period of dwell, a suitably shaped plunger acts upon the glass in the mold to form the desired article.

The invention will become more apparent from a consideration of the accompanying drawings constituting a part hereof in which like reference characters designate like parts and in which.

Figure 1:
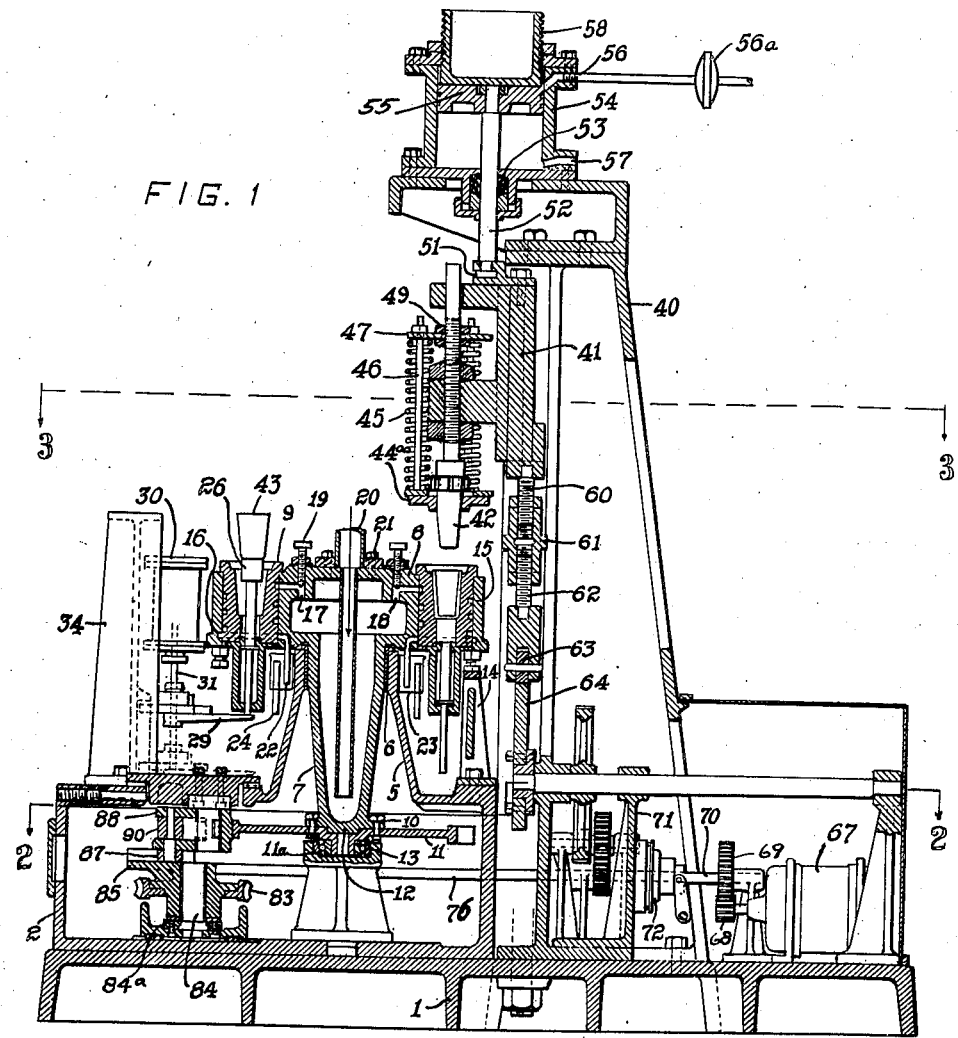
Fig. 1 is a vertical section partially in elevation of a ware-forming apparatus embodying the principles of this invention.
Figure 3:
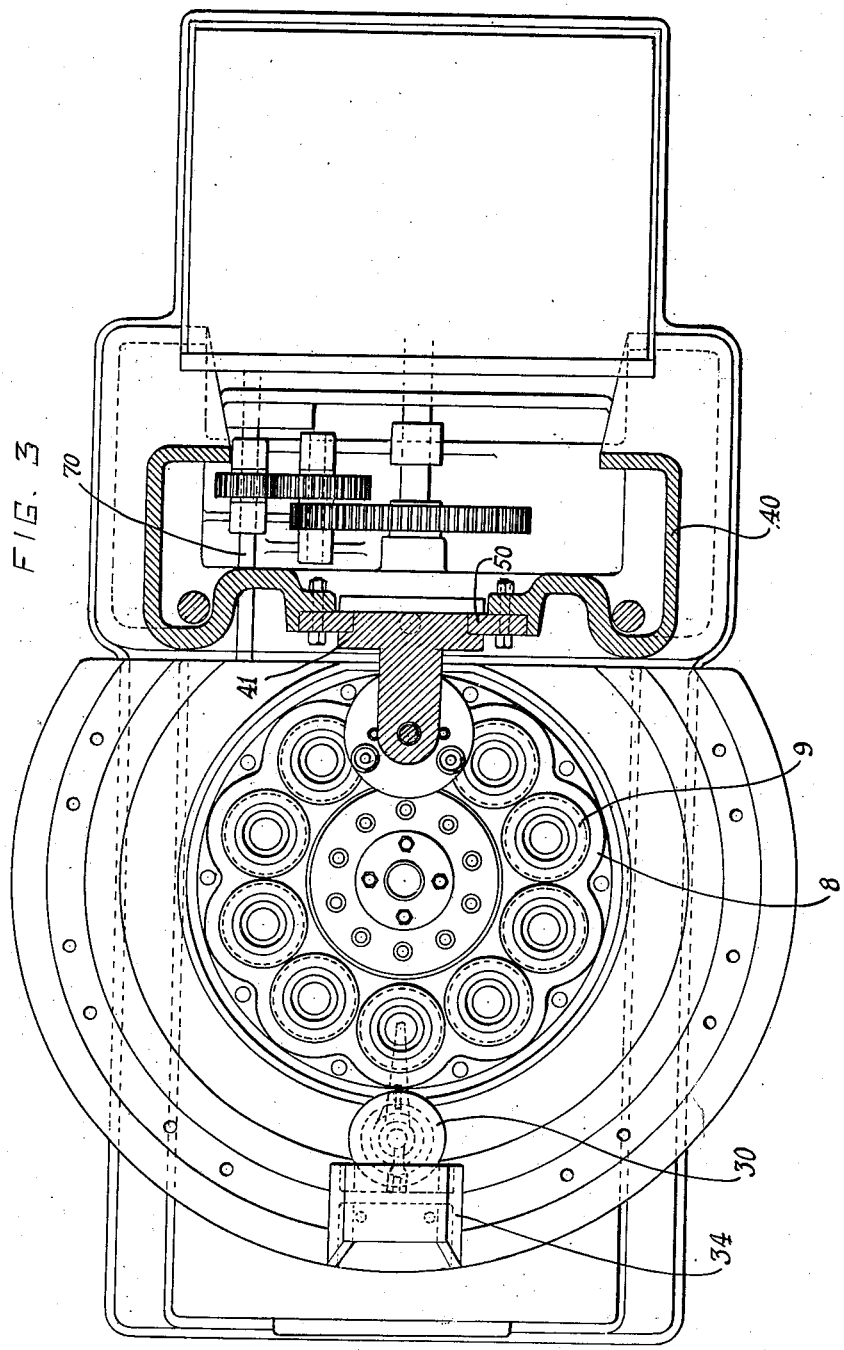
Figure 4:
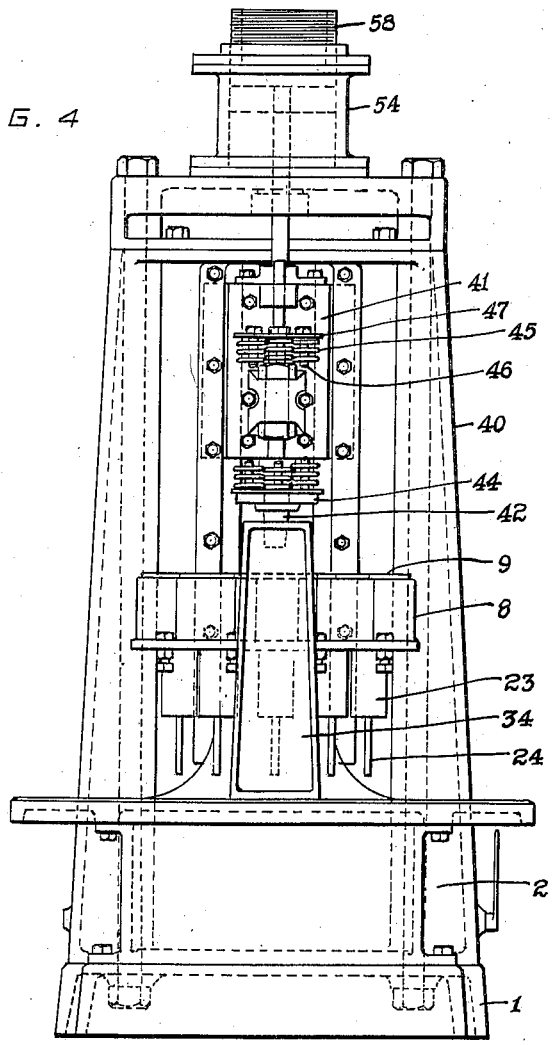

Fig. 3 a partial plan and cross-sectional view taken along the line 3—3, Fig. 1;

Fig. 4 a front elevational view of the apparatus shown in Fig. 1.

Fig. 5 an enlarged detail of a cross-section through a mold and a portion of the mold support or table;

Fig. 6 a cross-section partially in elevation of a valve and cam constituting a portion of a timer mechanism;

Fig. 7 a plan view of the ejector arm with the spring cover removed;

Fig. 8 an elevational view of the ejector arm of Fig. 7;

Fig. 9 a vertical section partially in elevation of a plunger and plunger mounting for the ware-forming apparatus of Fig. 1; and Fig. 10 a cross-sectional view of the plunger taken on the line 10—10, Fig. 9.

As shown in Fig. 1, the structure therein illustrated comprises a base 1 on which a combined table support and gear housing 2 is slidably mounted to allow for adjustment of the mold centers with the forming plunger. The housing 2 is secured to the base 1 by clamps 3 and screw bolts 4, Fig. 2. The top wall of the housing 2 is elevated to form a standard 5 in which is mounted a journal bearing 6 for receiving the journal of a column 7 depending from a table portion 8 which may be termed a mother-ring for a plurality of forming molds 9, which are angularly spaced therein. The table column 7 is of hollow construction and is provided with a flange 10 that is bolted on the upper face of a gear 11 commonly termed a Geneva gear wheel. The gear wheel 11 is provided with a hub 11a for mounting on the reduced end 12 of the column 7, which is provided with and supported by an anti-friction bearing 13 provided as a bottom support for the mold table.

The mother-ring or table portion 8 has a depth equal to or slightly greater than the heights of the molds 9, the molds being mounted in the ring in cylindrically bored sockets. The sockets and, consequently, the molds are closely spaced to maintain the table at a minimum diameter so that the moment of inertia of the table and molds about the table axis may be kept or is reduced to a minimum.

A supporting bracket 14 is bolted on top of housing 2 beneath table 8 to prevent distortion of the latter when molds 9 are subjected to the ware-forming pressures.

While air may be employed as a cooling medium for the molds, the molds and table are especially designed to employ water or low pressure steam as a cooling or temperature regulating medium. This cooling of the molds and adjoining table parts is shown in Figs. 1 and 5 of the drawings, and consists of a helical groove 15 on the outer periphery of the molds 9 which, when the mold is seated in the table, registers with an annular groove 16 adjacent the bottom of the cylindrical bores of the table and a drilled hole 17 adjacent the top of the table. The opening 17 communicates through passage 18 with the hollow interior of the table and column 7. Screws 19 are provided to control the size of opening of the passages 18, thereby regulating the supply of the cooling medium to the helical grooves 15 of the molds. The cooling medium, such as water, is supplied through conduit 20 extending centrally into the hollow column 7 and the fluid or air, whichever is employed, is conducted to the lower extremity of the hollow column and then circulates on the inner wall of the hollow column, rising upwardly against a hollow plug 21 that caps-off the top of the column. The fluid then flows through passages 18 to the helical groove 15 of the molds 9, thence around the annular groove 17 of the table into conduits 22 extending into an annular tank 23 that collects the waste fluid from the pipes 22, Fig. 5. The drain pipes 24 are provided to remove the fluid from the waste tank 23, which is a stationary member in which waste pipes 22 are freely movable with the rotation of the mold table 8.

The molds 9 are provided with ejectors or knock-out plugs 26, more clearly shown in Fig. 5, having a stem 27. The head portion of plug 26 forms the base of the matrix portion of the mold, as is shown in the mold beneath the plunger in Fig. 1 of the drawings and 28, Fig. 5, constitutes a stop to limit the travel of stem 27. When the tumbler is pressed in the mold, the ejector is subsequently actuated by a finger 29, Figs. 1, 7 and 8, which is actuated pneumatically by a cylinder 30 containing a piston having a stem 31, to which the finger 29 is attached. The finger 29 is steadied in its movement by a bifurcated member 32 engaging a tongue 33 provided in an upright frame 34 mounted on and attached to the gear housing 2. The application and release of pressure in cylinder 30 is controlled by a timer mechanism such as shown in Fig. 6 in which conduits 35 and 36 are connected to the cylinder 30, and the valve 37, controlling the admission and emission of pressure to the cylinder, is actuated by a cam 38 mounted on a shaft carrying cams that control the movement and dwell periods of the mold table and the application of pressure to the plunger. Such timing mechanism is of conventional form and in general use in the industry and, of itself, constitutes no part of the present invention.

A vertical frame or column 40 is mounted on the base 1 adjacent the table frame or gear box 2, and is provided with a slide 41 that carries the shaping plunger 42, that is of the shape of the inner surface contour of the tumbler 43 to be formed in the molds 9. The plunger is provided with a spring plate 44, Fig. 9, that is biased by a plurality of springs 45 nested around the plunger. The spring plate supports a mold ring 44a which forms a closure at the top rim of the forming mold, and springs 45 provide a certain amount of pressure on the mold ring independently of any pressure exerted on the plunger. The spring plate 44 is provided with guide rods 46 that are screwed at their lower ends to the spring plate and rods 46 further extend through a guide plate 47 to permit sliding movement of the rods therein. Nuts 48 on the ends of rods 46 constitute abutments for plate 47. Tension of springs 45 is variable by adjustment of lock nuts 49 on the plunger column.

The plunger slide 41 is movable in guides 50, Fig. 3, to maintain proper alignment of the plunger in its vertical movement. The head 41 is attached by a swivel connection 51 to a piston rod 52 extending through a packing gland 53 of a cylinder 54. Piston 55 adapted for reciprocating movement in cylinder 54 is actuated by fluid pressure supplied through the ports 56 and 57 connected to conduits 35 and 36, Fig. 6. A threaded cap or end member 58 is provided in cylinder 54 to adjust the stroke of the piston 55 in accordance with the degree of the plunger movement, thus saving compressed air and quickening the plunger movements.

The reciprocating slide or head 41 carrying the plunger 42 is provided with a threaded stud 60 having an adjusting nut 61, one end of which cooperates with another threaded stud 62 that carries a follower 63, which rests on a cam 64. Cam 64 supports the plunger slide and associated parts in the downward movement of the plunger until just before the ware is finished, the shape or contour of the cam 64 determining the character of the plunger movement, this being significant as will be hereinafter explained in the description of the operation of the apparatus.

Figure 2:
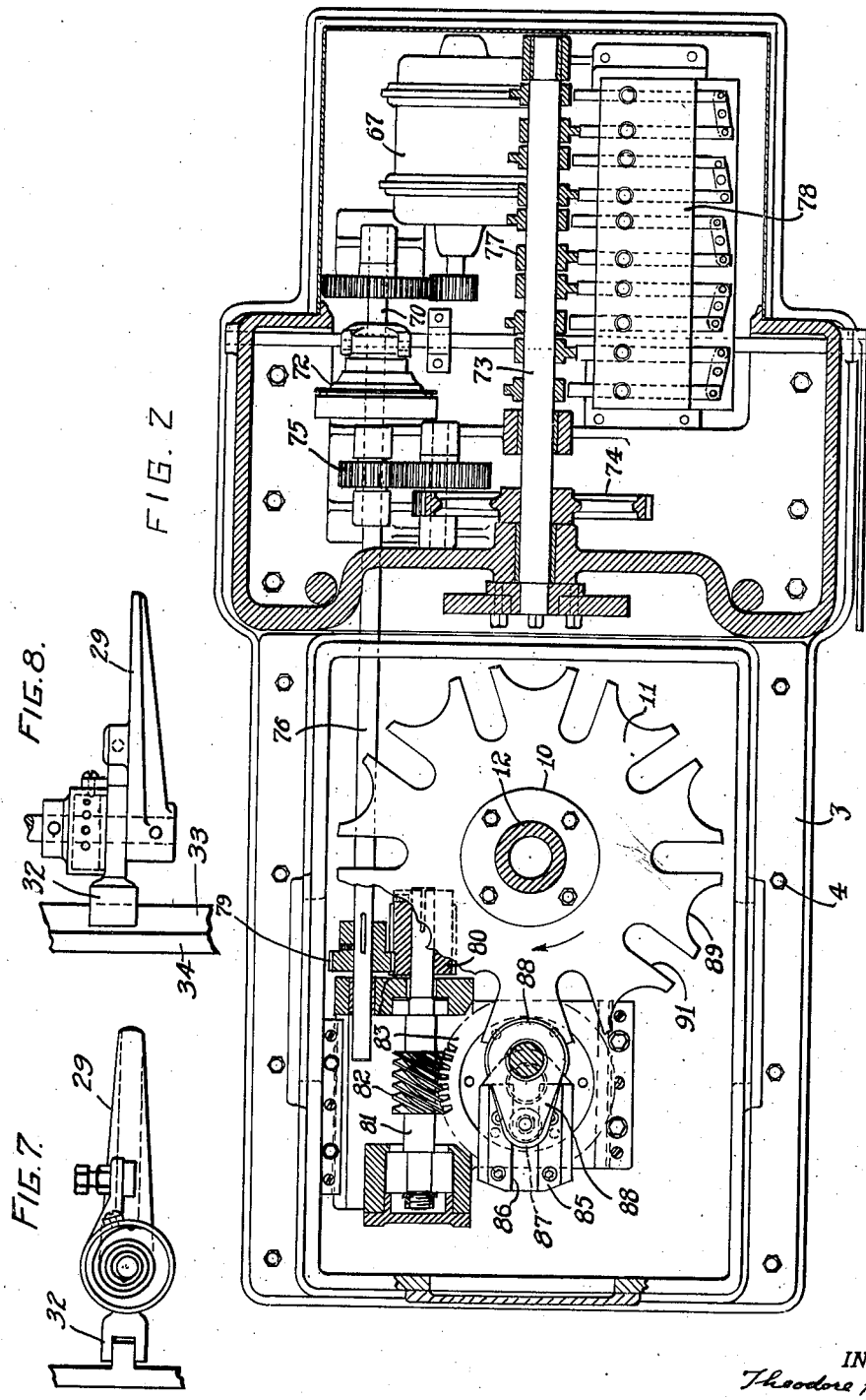
Fig. 2 is a horizontal section partially in elevation, taken along the line 2—2, Fig. 1.

The table and plunger movements are effected and co-ordinated by means of the following drive mechanism as shown in Figs. 1, 2 and 3.

A motor 67 is mounted on the base 1 and through a pinion 68 drives gear wheel 69 of a counter-shaft 70, which is journalled in a bracket 71 mounted on the base 1. A clutch 72 is provided to disconnect the entire operating mechanism from the motor 67. A cam shaft 73 is actuated by reduction gearing generally designated by the numerals 74 coacting with a pinion 75 of the table drive shaft 76. The cam shaft 73 carries a plurality of cams 77 such as the cam 38 of Fig. 6 of the drawings to control the application of fluid pressure through a valve box 78 to the various pneumatically operated parts including the ejectors 27 and the plunger piston 55.

The table drive consists of a pinion 79 that interacts with a gear-wheel 80 mounted on a worm shaft 81 carrying a worm 82 that interacts with the teeth of a worm gear 83 mounted on a stud shaft 84. Shaft 84 is mounted in a bracket 84a which is adjustably mounted upon the base of housing 2. Worm gear 83 is provided with a crank arm 85 having a guideway 86 for a slide block 87 carried by a bifurcated driver 88, one end of which is of cylindrical convex shape to engage the concave surface 89 of the Geneva wheel 11. The driver 88 also carries a roller 90 that engages slots 91 of the Geneva wheel 11. The slot 91 of the Geneva wheel is radial and is tangent to the circular path of the driving roller 90 at the time the roller enters and leaves the slot. By adjusting bracket 84a, the stud shaft 84 is adjusted to vary its center distance with the axis of the convex portion of the driver, thereby varying the indexing and dwell periods of the Geneva wheel 11. As the mold table 8 rotates with the Geneva wheel 11, a longer molding and shorter index period is obtainable than with the ordinary type of mold table drive.

The operation of the above described apparatus is briefly as follows: As is customary practice, the tumbler press is coordinated with a glass feeding mechanism that supplies segregated charges of molten glass to the forming molds 9, and the feeder operating parts are coordinated with the tumbler press through the timer mechanism by connecting such parts to the valve box 78, Fig. 2 of the drawings.

When motor 67 is energized the machine is set in motion with the forming molds 9 disposed at a glass receiving station beneath a point of discharge of the glass feeding mechanism (not shown) and a suitable mold charge or gob is dropped in the mold. Through the operation of the Geneva gear mechanism, shown in Figs. 1 and 2, the mold table 8 is subjected to angular movement intermittently, there being dwell periods during which the mold charges are received and the ware is formed by the plunger pressing or displacing the glass within the mold.

As previously described, the shaping plunger 42 is synchronized with the movement of the mold table 8 through a timer or valve box 78.

When a mold with its charge of molten glass has assumed the position beneath the plunger, as shown in Fig. 1, and is in register therewith, air will be supplied through the port 56 of cylinder 54, causing the piston 55 to travel downwardly, moving the plunger slide 41 carrying the plunger 42.

As previously explained, downward movement of the plunger and slide is entirely controlled by cam 64 against which the pressure of piston 55 is exerted. Consequently, the rate of plunger movement is in accordance with the fall of the cam 64 which is such that the plunger speed is greatest at the beginning of the plunger movement and gradually decreases at the end of the plunger stroke.

While cam 64 controls the rate of downward movement of the forming plunger 42, it does not control the distance of the plunger travel. The cam is of such contour that when the plunger 42 is about to reach the end of its pressure stroke, roller 63 leaves the cam surface, allowing the full pressure in cylinder 54, plus the weight of slide mechanism 41 to act upon the glass in the mold 9. By means of a conventional form pressure regulator in the conduit 35, Fig. 6, which is connected to port 56 of cylinder 54, Fig. 1, there is just enough force to produce the ware without producing what is termed a pressure crack.

Because of the stability of the plunger slide 41, plunger 42 will not be subjected to misalignment, and because of the relatively compact form of mold table and molds, eliminating the excessive radial proportions of prior art devices, the thermal expansion causing distortion of the mold table is also eliminated, thus assuring the production of tumblers of uniform and concentric walls, which is especially important when relatively thin-walled tumblers are desired.

The forming of the tumbler by the plunger acting upon the glass starts at high speed, the speed reducing as the article is nearing completion, and when the glass displaced by the plunger 42 strikes the mold ring 44a, it is near the end of its forming stroke. The excess pressure developed in the pressure cylinder 54 assures contact between the roller and cam during the downward travel of the plunger, thereby eliminating all possibility of jerky travel of the plunger. The formation of the tumblers is thus scientifically controlled with resultant uniformity in the quality of the product. Upward movement of the plunger 42 is entirely effected by piston 55.

The Geneva wheel is larger in diameter than the distance between mold centers to provide more accurate indexing.

By means of the cooling system for molds and table, as hereinbefore described, the molds can be constantly maintained at suitable working temperatures, thus eliminating variations in the mold alignment due to variations in the thermal properties of the mold metal and table parts.

By employing the inserted shell type molds in a mother-ring, so-called, the distance between molds is greatly reduced, which in conjunction with the light-weight of the molds and table, makes it possible to index the machine at high speed. This is important as the indexing time controls the time that the gob is received in a mold and the pressing takes place. The molds may be readily removed and are interchangeable for different sizes and shapes of tumblers, which also requires change of the plunger 42.

By employing the crank slide 85 on worm gear 83 to actuate crank 88 for indexing the Geneva gear wheel, rapid indexing is obtainable which permits maximum dwell between indexing periods resulting in increased capacity for the press.

Although one embodiment of the invention has been herein illustrated and described, it will be apparent to those skilled in the art that various modifications may be made in the details of construction without departing from the principles herein set forth.

I claim:

1. The method of making pressed tumblers which comprises charging a mold shaped to the outer contour of the finished article with a supply of molten glass, forming the charge by a plunger shaped to the inner dimensions of the finished article by subjecting the plunger to positive pressure of sufficient force to form the ware, and controlling the plunger travel independently of the degree of pressure to subject it to a controlled downward movement.

2. The method of making pressed tumblers and the like comprising charging a mold with molten glass, forming the charge by subjecting it to pressure of a vertically movable plunger in alignment with the mold controlling the pressure of the plunger to an amount just sufficient to form the glassware in the mold, and controlling the rate of downward movement of the plunger independently of the pressure acting upon the plunger and the resistance of the glass in the mold.

3. Apparatus for forming tumblers and the like comprising a mold for receiving a charge of molten glass, a vertically movable plunger in alignment with the mold and adapted to press the glass therein, pressure means other than gravity for subjecting the plunger to downward movement against the glass in the mold, and means independent of said pressure means controlling the rate of plunger movement.

4. Apparatus for forming tumblers and the like comprising a mold for receiving a charge of molten glass, a vertically movable plunger in alignment with the mold and adapted to press the glass therein to desired shape, pressure means acting upon the plunger of a degree sufficient to form the glass in the mold, and means independent of the pressure means for controlling the rate of plunger travel during a portion of the pressing cycle.

5. Apparatus for pressing tumblers and the like comprising a mold table having cylindrical bores in angularly spaced relation, molds embedded in the bores of said table, said molds being closely spaced and said table being of relatively small diameter, grooves formed in the outer periphery of the molds and ported passages in said table communicating with the grooves of the mold and with a source of cooling fluid, and means for supplying the cooling fluid under pressure to said mold grooves.

6. Apparatus for pressing tumblers and the like as set forth in the next preceding claim characterized by the table having a hollow column and the grooves on the outer periphery of said mold communicating with the hollow interior of the column, and means for circulating a cooling medium through the column and mold grooves.

7. Apparatus for forming pressed ware comprising a base, a rotary table mounted on said base, a vertical frame extending from the base having a plunger slide mounted thereon, a plunger in said slide and molds supported by the table, said mold table having a drive mechanism housed therebeneath and having a casing wall of the housing extending to and constituting a journal for the table.

8. Apparatus for forming tumblers and the like comprising a mold for receiving a charge of molten glass, a vertically movable plunger in alignment with the mold and adapted to press the glass therein, fluid pressure means for actuating the plunger and a movable abutment controlling the travel of the plunger to regulate the rate of travel of the plunger independently of the force of the fluid pressure means.

9. Apparatus for forming tumblers and the like comprising a mold for receiving a charge of molten glass, a vertically reciprocal plunger slide carrying a plunger in alignment with the mold and adapted to press the glass therein, a rotatable cam constituting a movable abutment on which the plunger slide rests during at least a portion of its travel, and fluid pressure means for actuating the plunger to yieldingly urge it against the cam in its downward movement, said cam determining the character and speed of the plunger stroke.

10. Apparatus for forming tumblers and the like comprising a mold for receiving a charge of molten glass, a vertically reciprocal plunger in alignment with the mold and adapted to press the glass therein, and means for subjecting the plunger to a positive decelerating stroke independently of the plunger actuating means and resistance to plunger travel in the glass of the mold.

11. Apparatus for forming tumblers and the like comprising a mold for receiving a charge of molten glass, a vertically reciprocal plunger in alignment with the mold and adapted to press the glass therein, fluid pressure actuating means for subjecting the plunger to downward movement against the glass in the mold, and means independent of said actuating means for positively controlling the reciprocal movements of the plunger.

12. Apparatus for pressing tumblers and the like comprising a mold table of low heat mass, a plurality of molds mounted on said table, cooling means for said table and molds, a reciprocating plunger in vertical alignment with the molds, means subjecting the mold table to rotary movement, fluid pressure means for subjecting the plunger to reciprocatory movement in timed relation with the movement of the mold table, and means independent of said fluid pressure actuating means for controlling the plunger travel in a predetermined manner.

THEODORE H. SLOAN.